F. F. BRADLEY.
MEASURING DEVICE.
APPLICATION FILED MAR. 7, 1917.
1,276,867.
Patented Aug. 27, 1918.
2 SHEETS—SHEET 1.
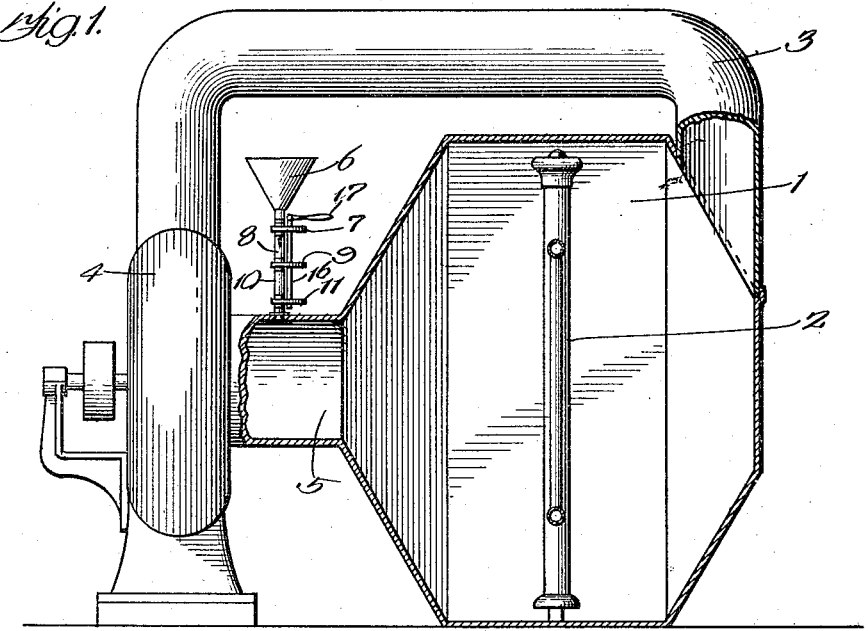
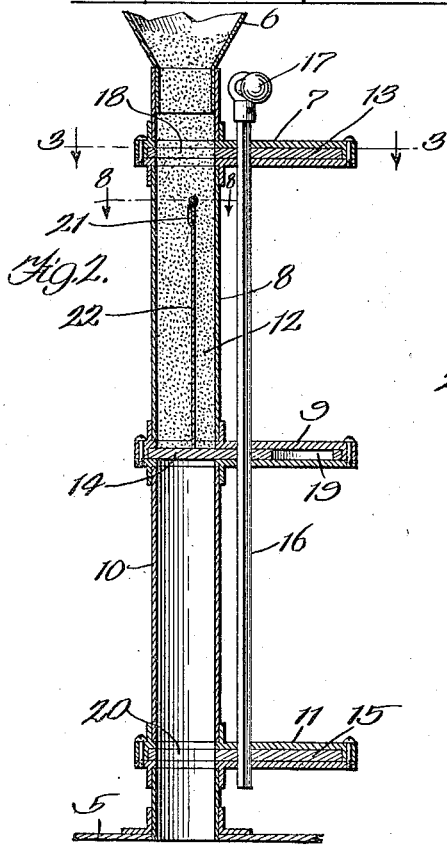
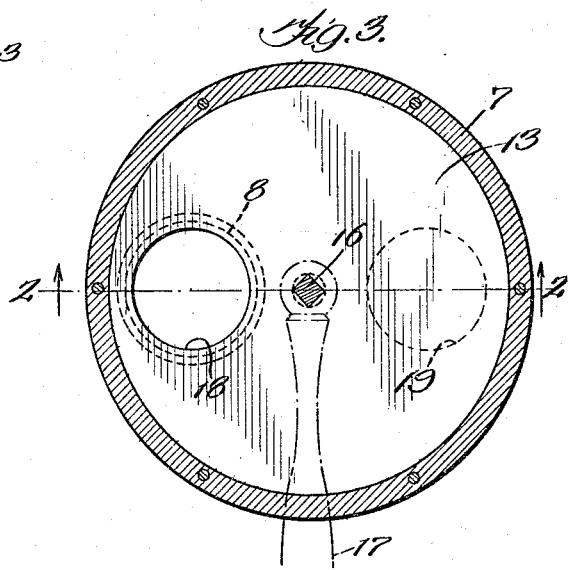
Inventor:
Franklin F. Bradley.
By G. L. Gregg
Atty.

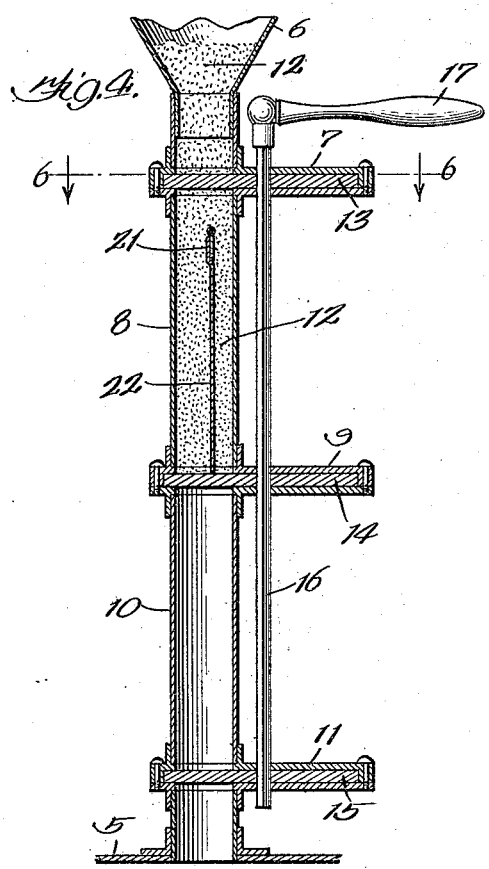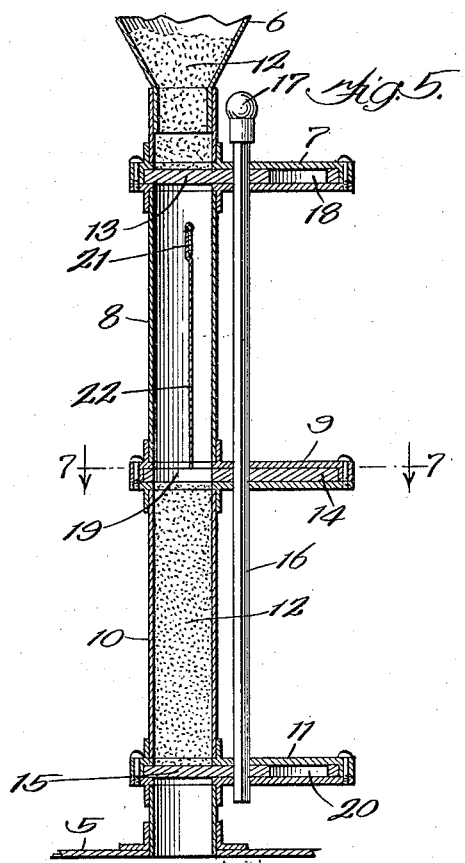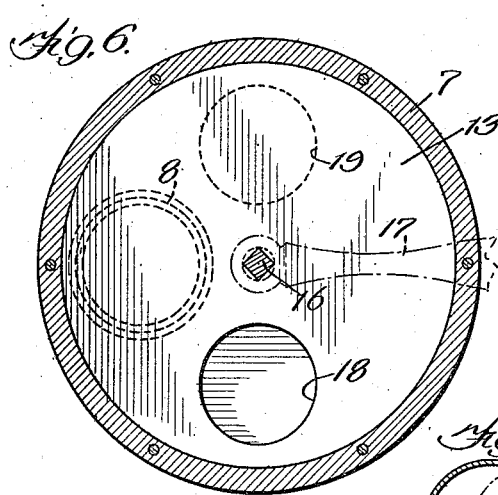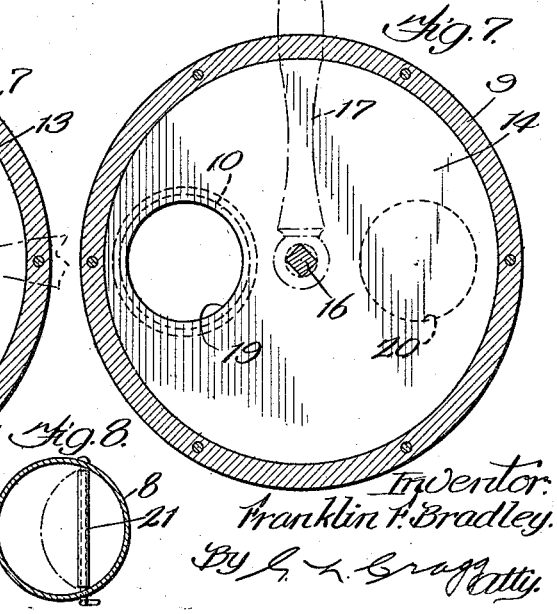

UNITED STATES PATENT OFFICE.

FRANKLIN F. BRADLEY, OF CHICAGO, ILLINOIS, ASSIGNOR TO BRADLEY & VROOMAN COMPANY, OF CHICAGO, ILLINOIS, A CORPORATION OF ILLINOIS.

MEASURING DEVICE.

1,276,867.  Specification of Letters Patent.  Patented Aug. 27, 1918.

Application filed March 7, 1917. Serial No. 153,149.

*To all whom it may concern:*

Be it known that I, FRANKLIN F. BRADLEY, citizen of the United States, residing at Chicago, in the county of Cook and State of Illinois, have invented a certain new and useful Improvement in Measuring Devices, of which the following is a full, clear, concise, and exact description.

My invention relates to measuring devices and is of particular service for supplying subdivided material to apparatus that is to be coated with such material.

In apparatus of this character a receptacle is employed for containing the objects to be coated and air, laden with the subdivided material, is drawn or forced past the object being coated, the subdivided material being caught upon the object that is coated with wet sizing or other adhesive. This apparatus is frequently used for coating metal objects, such as bedstead parts, with bronze powder.

It is the general object of my present invention to provide improved means whereby measured quantities of the subdivided material may be introduced into the receptacle. One feature of my invention resides in the employment of a pipe having a longitudinal diaphragm or partition therein that divides the interior of the pipe into two bores or passageways. There is a valve provided in conjunction with one of these passageways whereby such passageway may be opened or closed to prevent or permit the passage of material thereinto. This pipe, which communicates with the interior of the receptacle, thus has its holding capacity adjustable to enable it to measure different quantities of the powder or subdivided material to suit the amount thereof that is required in a given coating operation.

In accordance with another feature of my invention this pipe, with or without the aforesaid partition and valve, is provided at its ends with two cutoff valves each having a hole adapted for registry with the pipe. These two cut-off valves are desirably fixed with respect to each other and the holes therein are offset so that but one valve opening is in communication with the pipe at a time. By this arrangement a hopper may be located above the pipe in which hopper a reserve quantity of the subdivided material may be disposed and from which only a measured quantity thereof may be supplied to the receptacle since the cutoff valve that is adjacent the hopper is closed before and while the other cutoff valve that controls admission to the receptacle is opened.

I also desirably provide a second pipe which is a continuation of the first and is interposed between the same and the receptacle. The end of this additional pipe which is nearer the receptacle is provided with a third cutoff valve that is in fixed relation with the other two cutoff valves and is desirably so related thereto that its pipe will be open into the receptacle when this pipe is cut off from the other pipe whereby the measured quantity of powder previously admitted to the additional pipe may be discharged into the receptacle without permitting any of the air to escape through the pipes to carry the powder or subdivided material to the exterior of the receptacle.

I will explain my invention more fully by reference to the accompanying drawings showing the preferred embodiment thereof and in which Figure 1 is a view illustrating an apparatus of the character described equipped with the device of my invention; Fig. 2 is a view on line 2—2 of Fig. 3, on a smaller scale; Fig. 3 is a view on line 3—3 of Fig. 2; Figs. 4 and 5 are views similar to Fig. 2 but on a larger scale and showing different adjustments; Fig. 6 is a view on line 6—6 of Fig. 4; Fig. 7 is a view on line 7—7 of Fig. 5; and Fig. 8 is a view on line 8—8 of Fig. 2.

Like parts are indicated by similar characters of reference throughout the different figures.

In the apparatus illustrated the receptacle 1 is provided with means for permitting the entrance and exit of objects that are to be coated, the object 2 illustrated within the receptacle being a portion of a bedstead. The air pipe 3 connects one end of the receptacle 1 with a fan 4, the other end of the receptacle being connected with this fan by an air pipe 5, the pipes 3 and 5 virtually constituting continuations of the receptacle 1. When the fan is set into operation air is circulated through the receptacle so that this air may carry powder or subdivided material against the object 2, this material adhering to the object which is coated with a suitable adhesive for the purpose. The subdivided material is initially introduced into a hopper 6 whose lower end is connected with the top side of a valve casing 7, the bottom side of this casing being connected with the upper end of the measuring pipe 8 whose lower end is connected with the top side of the valve casing 9. The under side of the valve casing 9 is connected with the upper end of the discharge pipe 10 whose lower end is connected with the top side of the valve casing 11. The lower side of this latter valve casing is connected with the receptacle through the intermediation of the pipe 5. Said valve casings and the pipes 8 and 10 together form a combined casing containing the valve mechanism which is employed in measuring the quantities of subdivided material (illustrated by the dots 12) and controlling the discharge thereof. Said valve casings are desirably similar and the cutoff valves 13, 14 and 15 are desirably in the form of disks which turn within their respective casings that define and guide the disks in their rotation. The valve disks are in fixed relation with each other, having square holes at their centers through which a square rod 16 passes and which rod fits said square holes. The holes in the valve casings through which the rod 16 passes are similar so that the rod may be turned and with it carry the valves. The upper end of the rod carries a handle 17 by which the rod may be turned. The valve opening 18 in disk 13 may be diametrically opposite the valve opening 19 in the valve 14. The valve opening 20 may be diametrically opposite the valve opening 19 and therefore in alinement with the valve opening 18. When the valves are in the adjustment illustrated in Fig. 2 the lower end of the measuring pipe 8 is closed by the valve 14 while the upper end of measuring pipe is opened at the valve 13 whereby the powder may enter the measuring pipe from the hopper 6. When the valves are in the adjustment illustrated in Fig. 4 both of the cutoff valves 13 and 14 are closed so that no more powder may enter the measuring pipe and none will be discharged therefrom. When the valves are in the adjustment illustrated in Fig. 5 the cutoff valve 13 is still closed while the valve 14 is opened whereby the quantity of powder measured in the pipe 8 may find access to the discharge pipe 10. In order that the powder may enter the receptacle from the discharge pipe 10 the valves are again closed in the adjustment shown in Fig. 2 in which the valve 14 closes the upper end of the discharge pipe and the valve 15 opens the lower end of this pipe whereby the powder may enter the receptacle, the valve 14 preventing the exit of any powder laden air and preventing the passage of air through the measuring pipe 8 and the hopper 6 that would scatter the same upon the exterior of the hopper. By placing the openings 18 and 19 diametrically opposite there is an interval in which both valves 13 and 14 simultaneously close the measuring pipe at both ends and for a similar reason there is also an interval in which both valves 14 and 15 simultaneously close the discharge pipe. By this arrangement the measuring pipe 8 is completely filled before the contents may be discharged therefrom and subsequently the discharge pipe is completely filled before its contents are emptied. Predetermined fixed quantities of the subdivided material are thus assured entry within the receptacle.

The amount of powder measured by the measuring pipe 8 is adjustably determined by means of the valve 21 and the partition 22. When this valve 21 is thrown to the right it forms a transverse continuation of the partition 22 and as this partition extends to the valve 14, the space confined by the partition 22 and valve 21 is cutoff from the balance of the space within the measuring pipe so that this part of the space will not receive the powder. This arrangement is employed when the object to be coated, or a given run of the apparatus, requires less powder than that which would fill the entire pipe 8.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A measuring pipe in combination with valves at the ends of the measuring pipe, the valve at one end permitting admission of material to the measuring pipe and the valve at the other end permitting discharge of material that is measured in the measuring pipe between the valves; a discharge pipe communicating with the measuring pipe, the discharge end of the discharge pipe having a pipe closing valve; and means common to the valve between the measuring and discharge pipes and the pipe closing valve at the end of the discharge pipe for operating these valves together, these two valves having openings so relatively disposed that when either of these two valves is opened the other valve is closed.

2. A measuring pipe in combination with valves at the ends of the measuring pipe, the valve at one end permitting admission of material to the measuring pipe and the valve at the other end permitting discharge of material that is measured in the measuring pipe between the valves; a discharge pipe communicating with the measuring pipe, the discharge end of the discharge pipe having a pipe closing valve; and means common to the valves for operating them together, the valve at the intake end of the measuring pipe and the valve at the discharge end of the measuring pipe having openings so relatively disposed that when either of these two valves is opened the other valve is closed, while the valve at the discharge end of the measuring pipe and the valve at the discharge end of the discharge pipe have openings so relatively disposed that when either of these two valves is opened the other valve is closed.

3. A measuring pipe in combination with valves at the ends of the measuring pipe, the valve at one end permitting admission of material to the measuring pipe and the valve at the other end permitting discharge of material that is measured in the measuring pipe between the valves; a discharge pipe communicating with the measuring pipe, the discharge end of the discharge pipe having a pipe closing valve; and means common to the valve between the measuring and discharge pipes and the pipe closing valve at the end of the discharge pipe for operating these valves together, these two valves having openings so relatively disposed that when either of these two valves is opened the other valve is closed and whereby both valves may be closed at the same time.

4. A measuring pipe in combination with valves at the ends of the measuring pipe, the valve at one end permitting admission of material to the measuring pipe and the valve at the other end permitting discharge of material that is measured in the measuring pipe between the valves; a discharge pipe communicating with the measuring pipe, the discharge end of the discharge pipe having a pipe closing valve; and means common to the valves for operating them together, the valve at the intake end of the measuring pipe and the valve at the discharge end of the measuring pipe having openings so relatively disposed that when either of these two valves is opened the other valve is closed and whereby both of these valves may be closed at the same time, while the valve at the discharge end of the measuring pipe and the valve at the discharge end of the discharge pipe have openings so relatively disposed that when either of these two valves is opened the other valve is closed and whereby both of these valves may be closed at the same time.

5. A measuring pipe in combination with a valve at the discharge end of the measuring pipe; a partition in and extending longitudinally of the measuring pipe; and a second valve coöperating with the partition and the aforesaid valve for excluding a part of the space within the measuring pipe from receiving material to be measured.

6. A measuring pipe in combination with a valve at the discharge end of the measuring pipe; a partition in and extending longitudinally of the measuring pipe; a second valve coöperating with the partition and the aforesaid valve for excluding a part of the space within the measuring pipe from receiving material to be measured; and a valve at the admission end of the measuring pipe.

7. A measuring pipe in combination with a valve at the discharge end of the measuring pipe; a partition in and extending longitudinally of the measuring pipe; a second valve coöperating with the partition and the aforesaid valve for excluding a part of the space within the measuring pipe from receiving material to be measured; a valve at the admission end of the measuring pipe; and means common to the valves at the admission and discharge ends of the measuring pipe for operating these valves together, these two valves having openings so relatively disposed that when either of these two valves is opened the other valve is closed.

8. A measuring pipe in combination with a valve at the discharge end of the measuring pipe; a partition in and extending longitudinally of the measuring pipe; a second valve coöperating with the partition and the aforesaid valve for excluding a part of the space within the measuring pipe from receiving material to be measured; a valve at the admission end of the measuring pipe; and means common to the valves at the admission and discharge ends of the measuring pipe for operating these valves together, these two valves having openings so relatively disposed that when either of these two valves is opened the other valve is closed and whereby both valves may be closed at the same time.

In witness whereof, I hereunto subscribe my name this 26th day of February, A. D. 1917.

FRANKLIN F. BRADLEY.

Copies of this patent may be obtained for five cents each, by addressing the "Commissioner of Patents, Washington, D. C."